3,186,103
METHOD OF REMOVING LIQUID FROM A FILTER CAKE USED IN A VACUUM PROCESS
Georges Burton, Rixensart, Belgium, assignor to Institut National de l'Industrie Charbonniere, Liege, Belgium
No Drawing. Filed Jan. 16, 1962, Ser. No. 166,712
Claims priority, application Belgium, Sept. 28, 1961, 608,663
1 Claim. (Cl. 34—15)

The present invention relates to a process intended to reduce the water content of filter cakes obtained in vacuum filters and filter presses, including their application to coal sludge.

It is known that filter cakes obtained under these conditions after a normal drainage period retain a residual water content varying from 20 to 30% of the weight of the solid material, depending on the nature and the granulometry of the product treated.

The only practical method at present consists in drying the product after it leaves the filter. This is done by heating, the water being evacuated in the form of vapour at the cost of very great expenditure of calories required for the vaporisation.

It would be extremely advantageous to effect a considerable degree of drying on the filter itself.

It is known that the residual humidity of filter cakes depends on the viscosity of the water which they contain and that this viscosity may be substantially reduced by heating.

The difficulty is to supply the calories required for this heating sufficiently quickly throughout the entire mass of the filter cake in order not to reduce to the filtration capacity, and in such a manner as not to risk changing the physical and chemical properties of the product treated (for example by fusion, oxidation, and ignition in the case of coal sludges).

Processes exist in which the heat is supplied by a hot gas or by radiation. The transmission of heat in the mass of the filter cake is principally effected by liberation of the sensible heat of the gas and by conduction. In the case of thick filter cakes which are only slightly permeable and opaque to infra-red rays, these processes are slow, cause superficial overheating of the filter cake with a risk of deterioration of the product, and reduce the capacity of the filter.

In the process forming the subject of the present invention, heat is supplied by condensation of water vapour inside the filter cake. Live steam is brought into contact with the filter cake, a condensation front progresses rapidly from the surface towards the bottom, leaving behind it a heated zone in which the temperatures of the filter cake are stabilised at a value corresponding to the boiling temperature of water at the pressure prevailing at the point under consideration. In this zone very rapid and very effective drainage is effected, accompanied by slight evaporation due to the liberation of the sensible heat of the steam.

The phenomenon is very rapid. For example, a flotation sludge cake of a thickness of 25 mm. subjected to a vacuum of 700 mm. mercury and to a flow of super-heated steam at 150° C. is brought to its temperature of equilibrium in less than 30 seconds and at that moment contains only 10% humidity in the hot product and less than 9% after cooling.

The entire operation is carried out in a neutral medium and at relatively low temperatures; there is no risk of deterioration of the properties of the product treated.

The process is essentially based on an improvement of the drainage of the filter cake due to the reduction of the viscosity of the water by raising its temperature, and as a result the amount of heat expended is considerably smaller than that which would be necessary to evaporate the same quantity of water.

As compared with existing processes, the process according to the invention offers the following advantages:

(1) Economy of investment and of labour expenses as the result of the possible elimination of thermal drying.

(2) A substantial saving in calories through the practically complete saving of the heat of vaporisation of the water to be evacuated.

(3) A considerable saving in power consumed by the vacuum pump in the case of vacuum filters and the possibility of maintaining a greater vacuum.

(4) Rapidity of heat exchange and drainage making it possible to maintain the capacity of the filter at a satisfactory level.

(5) In the particular case of products which can be deteriorated by air or heat, the suppression of the risk of deterioration, the operation taking place in a neutral medium and at a low temperature.

What is claimed is:

In a method of removing liquid from a filter cake used in a vacuum process employing the said filter cake of approximate thickness of 25 mm., the steps of subjecting said filter cake while under a vacuum of about 700 mm. of Hg to a flow of superheated steam at about 150° C. and condensing the steam in said cake for 30 seconds to cause rapid flowing out of the liquid from the said cake during this period so that the cake contains approximately 10% humidity while at said temperature, and cooling said cake, whereby the humidity of the cake is reduced to about 9%.

References Cited by the Examiner

UNITED STATES PATENTS

| | | | |
|---|---|---|---|
| 315,837 | 4/85 | Reford | 34—37 |
| 2,181,672 | 11/39 | Sutcliffe | 34—37 |
| 2,702,433 | 2/55 | Cohen | 34—37 |
| 2,838,982 | 6/58 | Dupasquier | 34—37 |
| 3,056,213 | 10/62 | Kellogg | 34—37 |

NORMAN YUDKOFF, *Primary Examiner.*